US008077272B2

(12) United States Patent
Shimura et al.

(10) Patent No.: US 8,077,272 B2
(45) Date of Patent: Dec. 13, 2011

(54) PLANAR LIGHT-EMITTING DEVICE AND LIQUID CRYSTAL DISPLAY APPARATUS

(75) Inventors: Takashi Shimura, Yamanashi-ken (JP); Taku Kumasaka, Tsuru (JP)

(73) Assignee: Citizen Electronics Co., Ltd., Yamanashi-Ken (JP)

( * ) Notice: Subject to any disclaimer, the term of this patent is extended or adjusted under 35 U.S.C. 154(b) by 235 days.

(21) Appl. No.: 12/434,435

(22) Filed: May 1, 2009

(65) Prior Publication Data
US 2009/0273732 A1 Nov. 5, 2009

(30) Foreign Application Priority Data

May 2, 2008 (JP) ................................. 2008-120394

(51) Int. Cl.
*G02F 1/1335* (2006.01)
*F21V 7/04* (2006.01)
(52) U.S. Cl. ......................................... 349/65; 362/616
(58) Field of Classification Search .................... 349/65; 362/615, 616
See application file for complete search history.

(56) References Cited

U.S. PATENT DOCUMENTS

| 6,927,812 B2 * | 8/2005 | Cho | 349/65 |
| 7,699,517 B2 * | 4/2010 | Lai | 362/615 |
| 2006/0221638 A1 * | 10/2006 | Chew et al. | 362/613 |

FOREIGN PATENT DOCUMENTS

| JP | 9-186825 | 7/1997 |
| JP | 11-288611 | 10/1999 |

* cited by examiner

*Primary Examiner* — Mark Robinson
*Assistant Examiner* — Robert Tavlykaev
(74) *Attorney, Agent, or Firm* — Wenderoth, Lind & Ponack, L.L.P.

(57) ABSTRACT

A planar light-emitting device has a plurality of light-emitting units each having a lightguide plate having an upper surface as a light-exiting surface, a lower surface opposite to the light-exiting surface, a peripheral side surface extending between the respective peripheral edges of the upper surface and the lower surface, and a light entrance surface defined by a part of the peripheral side surface. Each light-emitting unit further has a light-emitting set adjacent to the light entrance surface to emit light into the lightguide plate through the light entrance surface, and a support member that fixedly supports the light source and the lightguide plate. The light-emitting units are arranged side by side so that the light-exiting or upper surfaces of their respective lightguide plates are substantially flush with each other.

14 Claims, 5 Drawing Sheets

[Fig. 1]
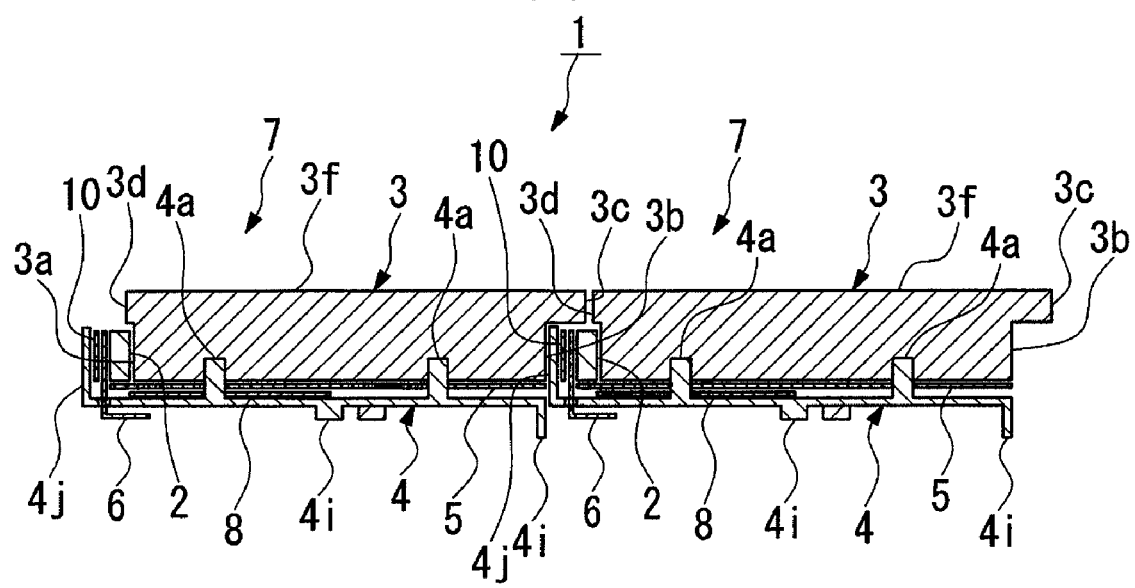
[Fig. 2]
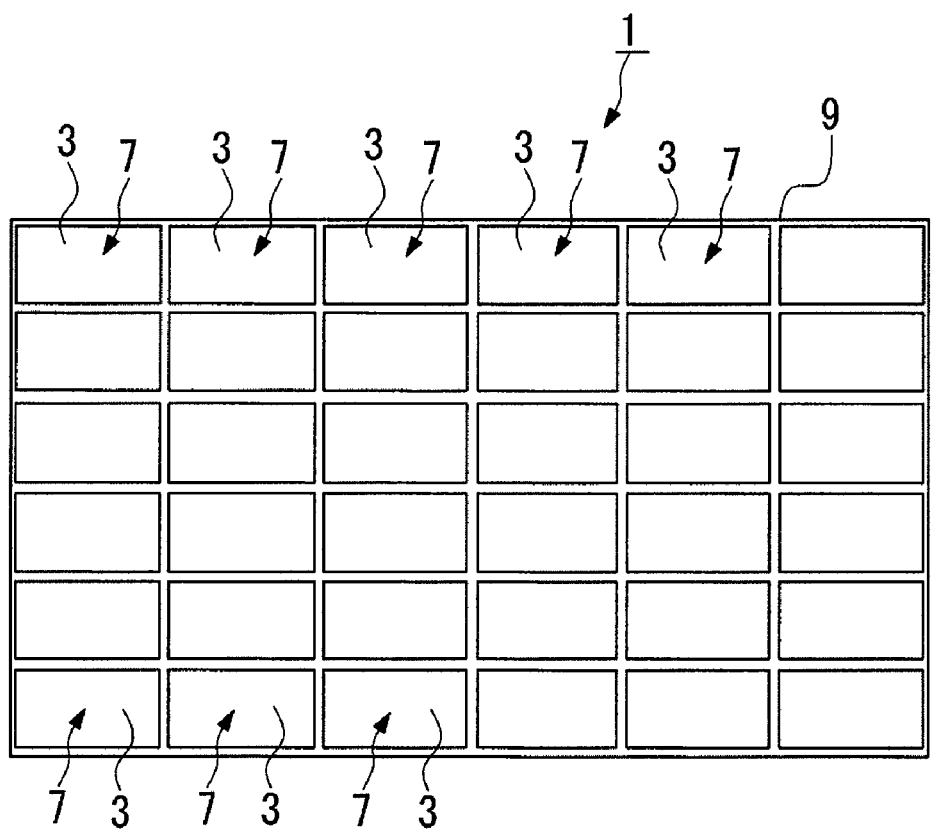

[Fig. 3]
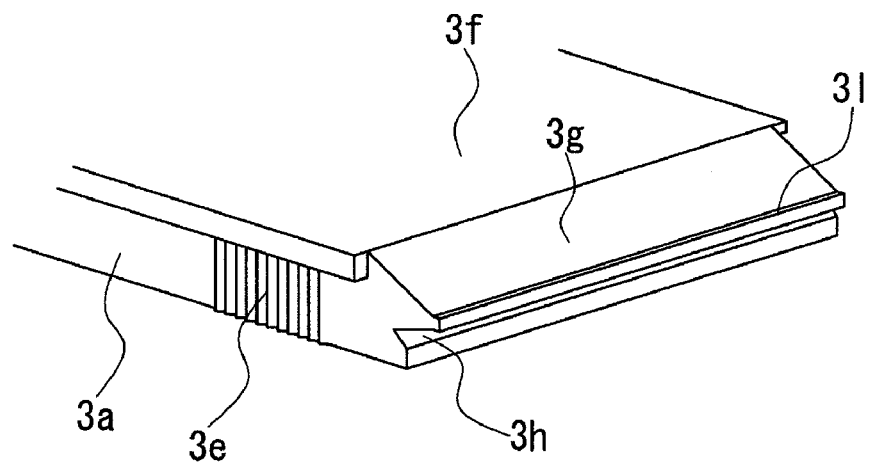
[Fig. 4]
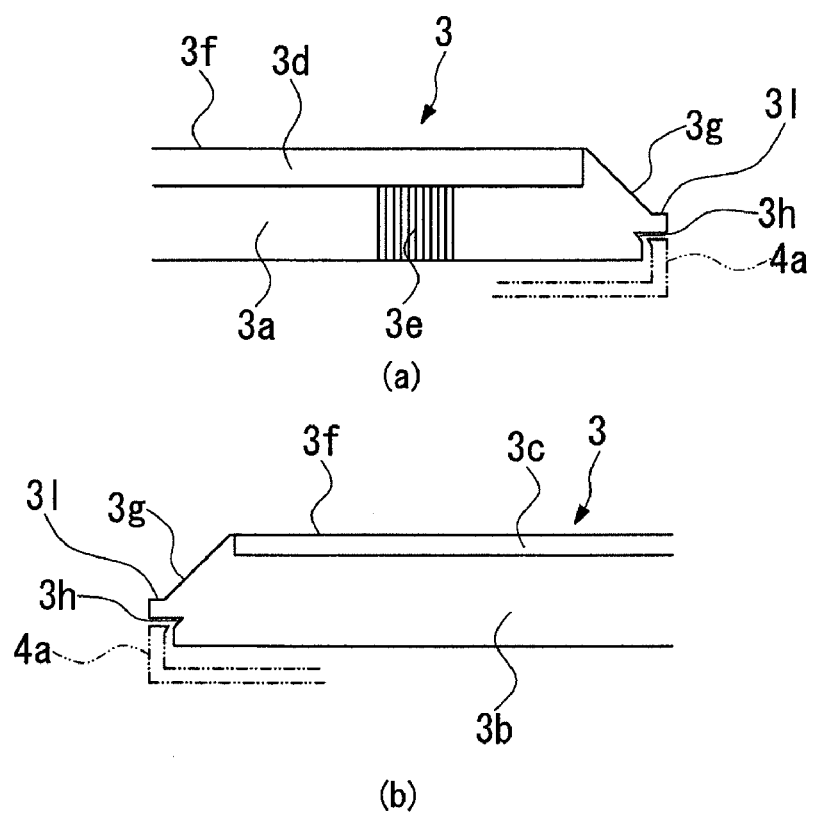
(a)
(b)

[Fig. 5]
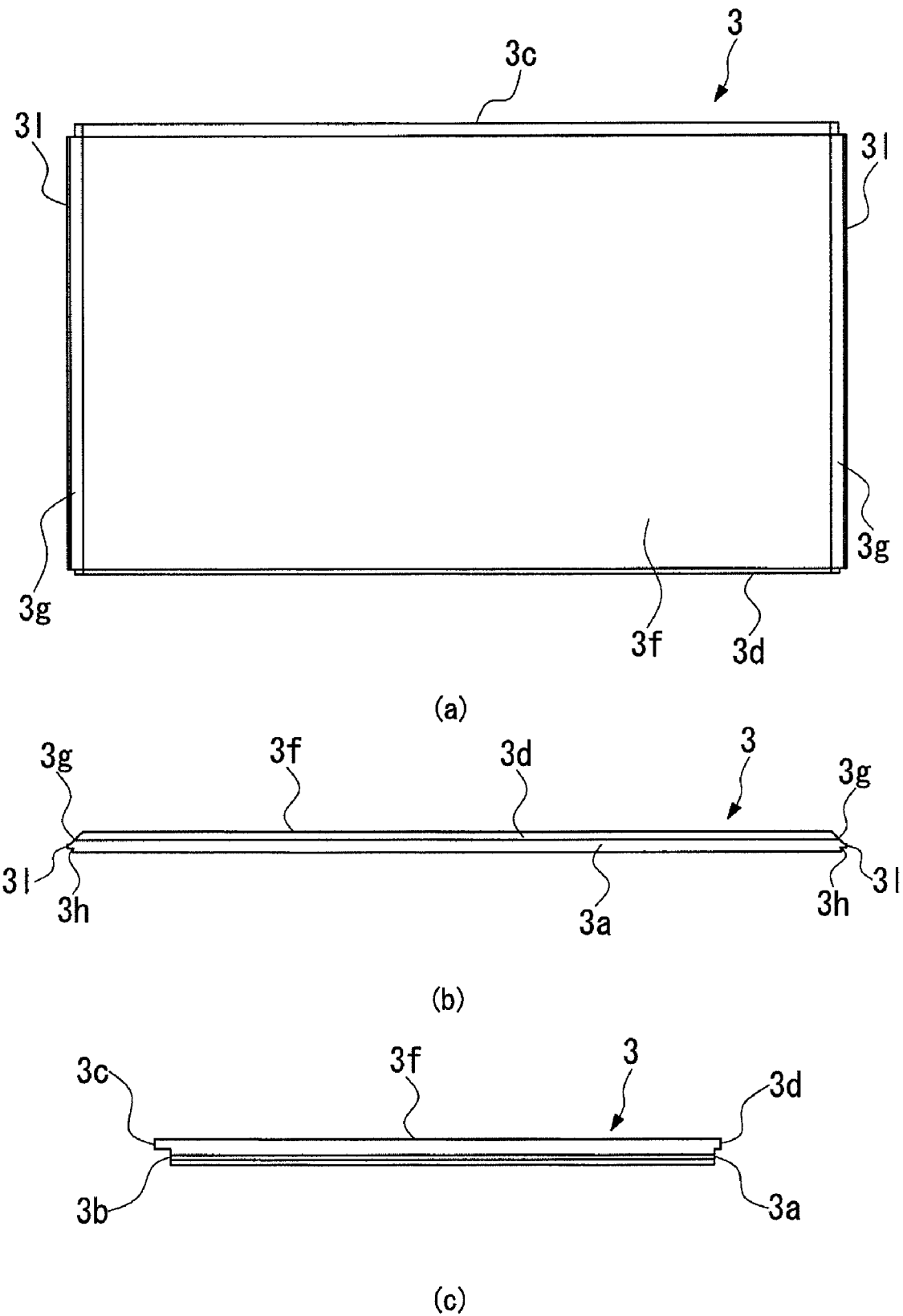

[Fig. 6]
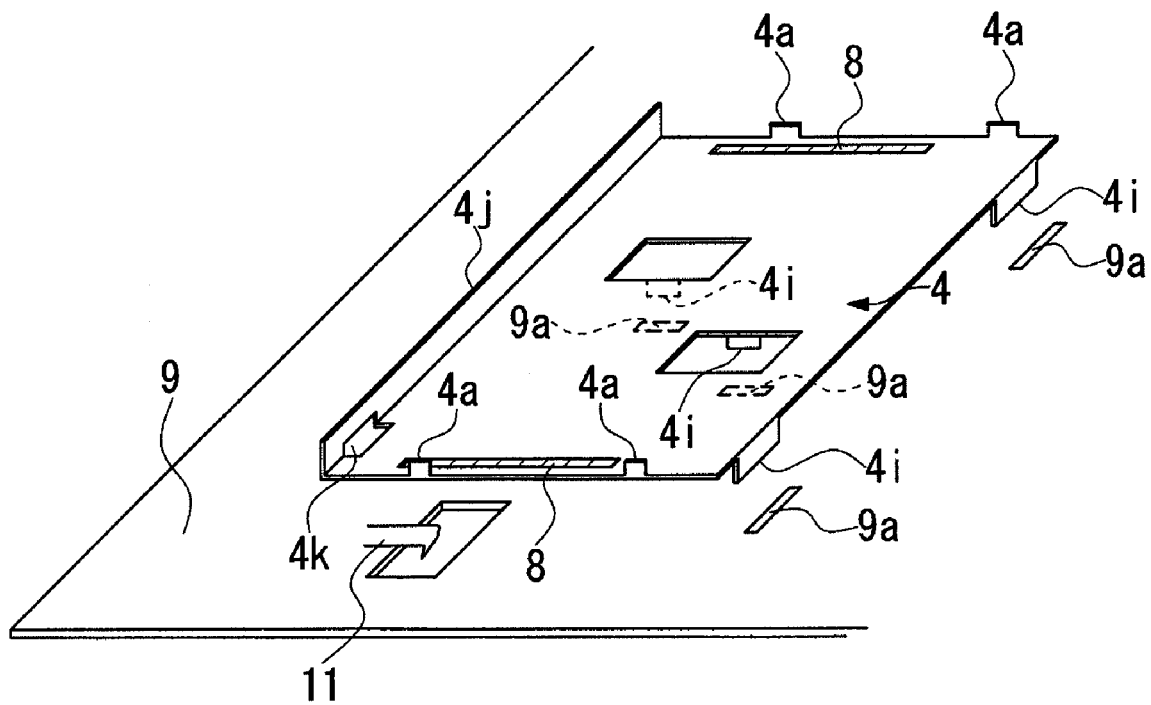
[Fig.7]
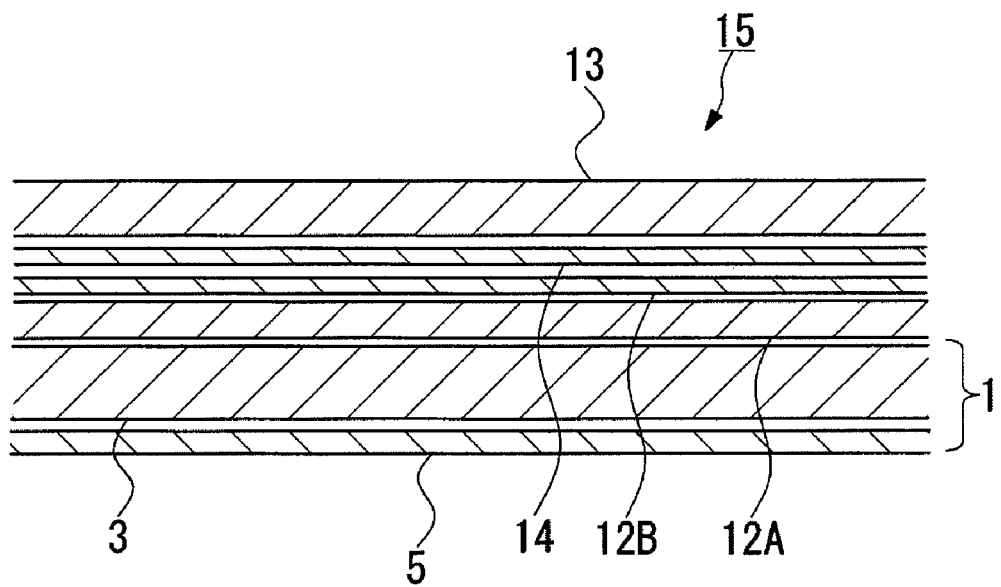

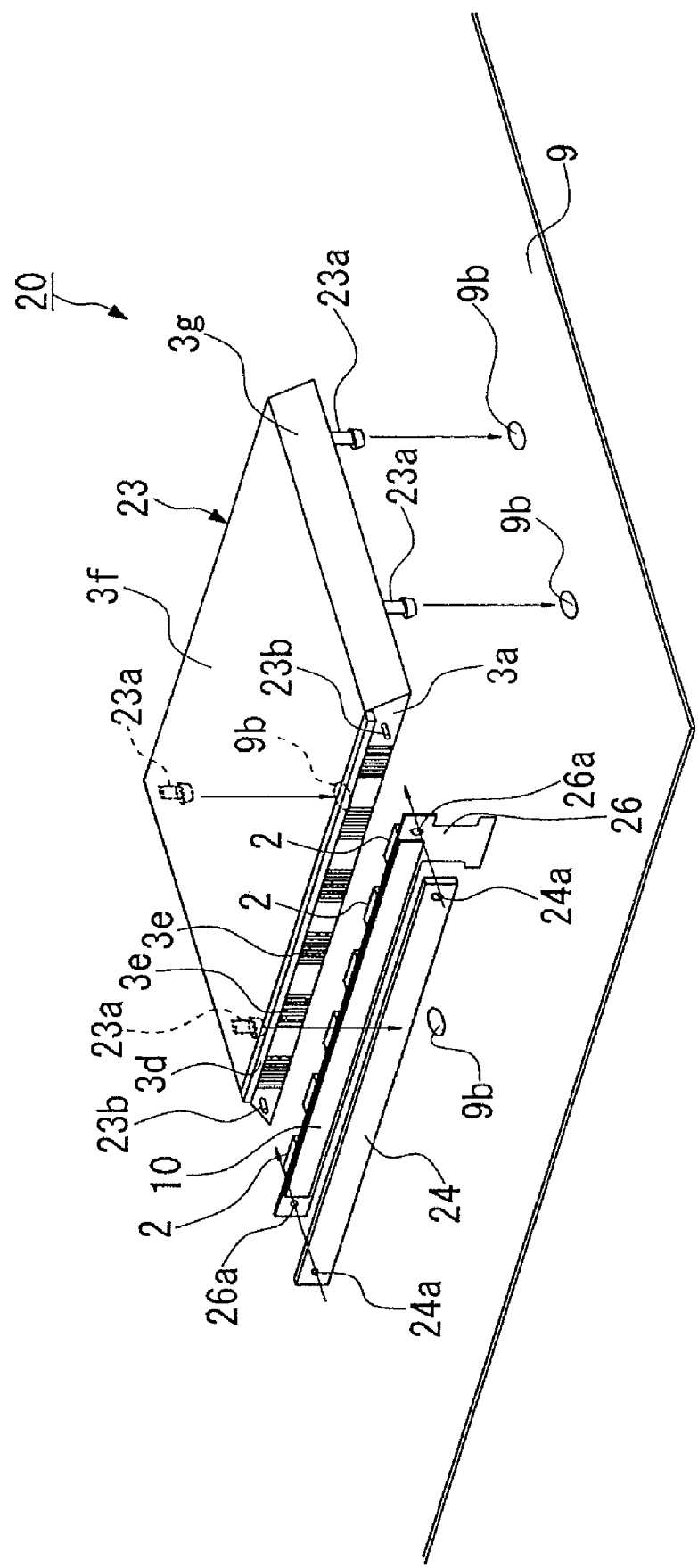
[Fig. 8]

PLANAR LIGHT-EMITTING DEVICE AND LIQUID CRYSTAL DISPLAY APPARATUS

This application claims priority under 35 U.S.C. §119 to Japanese Patent application No. JP2008-120394 filed on May 2, 2008, the entire contents of which are hereby incorporated by reference.

BACKGROUND OF THE INVENTION

1. Field of the Invention

The present invention relates to a planar light-emitting device that illuminates a liquid crystal display panel or the like. The present invention also relates to a liquid crystal display apparatus using such a planar light-emitting device.

2. Description of Related Art

Liquid crystal display apparatuses are widely used as the large-sized displays of flat-screen televisions and monitors, etc. These liquid crystal display apparatuses employ a backlight unit that applies illuminating light to a liquid crystal display panel from the back or the lower side of the liquid crystal display panel to enhance the luminance of the display screen.

The backlight unit has a lightguide plate and a light source comprising, for example, a plurality of light-emitting diodes (LEDs) disposed along one side edge surface of the lightguide plate. The lightguide plate receives light from the LED light source, guides the light through the lightguide plate and emits the guided light from the whole light-exiting surface of the lightguide plate toward a liquid crystal display panel.

Recently, as liquid crystal televisions increase in size, backlight units used therein have been demanded to further reduce in weight and thickness. In this regard, there have been some problems to be solved. As the thickness of a lightguide plate constituting a backlight unit is reduced, it becomes likely that color irregularity and luminance unevenness will occur in light emitted from the lightguide plate. If injection molding is employed as a method of producing a large-sized lightguide plate, it is difficult to fill the resin material throughout the molding tool for the large lightguide plate. Increasing the injection pressure can solve this problem, which, however, causes an increase in installation cost. Extrusion molding can produce large-sized and thin lightguide plates but cannot appropriately form microscopic optical configurations on the lightguide plates.

Meanwhile, there have been developed planar light-emitting devices in which a plurality of lightguide plates are arranged side by side with their respective upper surfaces as light exiting-surfaces being flush with each other and a plurality of light sources are provided in association with the lightguide plates to obtain a wide light-exiting surface (see Japanese Patent Application Publication Nos. Hei 9-186825 and Hei 11-288611).

In the planar light-emitting devices disclosed in the above-described Japanese Patent Application Publications, however, a plurality of light sources and lightguide plates are each placed directly in a frame or on a board when these components are mounted. Therefore, it is difficult to accurately position each lightguide plate with respect to the optical axis of the corresponding light source. In addition, it is difficult or may be impossible to replace only one or more lightguide plates suffering from luminance unevenness or other problem.

BRIEF SUMMARY OF THE INVENTION

The present invention has been made in view of the above-described problems. Accordingly, an object of the present invention is to provide a light-emitting device having a plurality of arrayed lightguide plates that constitutes a large-sized planar light-emitting surface, the lightguide plates each of which is accurately positioned with respect to the optical axis of the corresponding light source and which facilitates the component replacing operation. Another object of the present invention is to provide a liquid crystal display apparatus using the planar light-emitting device of the present invention.

The present invention provides a planar light-emitting device including a plurality of light-emitting units. Each light-emitting unit has a lightguide plate having an upper surface as a light-exiting surface, a lower surface opposite to the upper surface, a peripheral side surface extending between the respective peripheral edges of the upper surface and the lower surface, and a light entrance surface defined by a part of the peripheral side surface. Each light-emitting unit further has a light source set adjacent to the light entrance surface to emit light into the lightguide plate through the light entrance surface, and a support member that fixedly supports the light source and the lightguide plate. The light-emitting units are arranged side by side so that the upper or light-exiting surfaces of their respective lightguide plates are substantially flush with each other.

The planar light-emitting device of the present invention can achieve a higher accuracy of optical matching between the light sources and the corresponding lightguide plates than in the case of mounting light sources and lightguide plates directly on a large-sized board. If there is luminance unevenness or other problem in this planar light-emitting device, one or more defective light-emitting units can be replaced individually, thus facilitating the replacing operation. In addition, it is possible to realize a large-sized planar light-emitting device having a light-exiting surface with reduced luminance unevenness by installing a plurality of light-emitting units having small-sized lightguide plates that can be produced easily and at reduced cost without the need of a large-sized molding machine and mold processing as required in the case of manufacturing the above-described conventional planar light-emitting devices. It is also possible to allow the support member to function as a heat-dissipating member.

Specifically, the planar light-emitting device may be arranged as follows. The peripheral side surface has the light entrance surface, an opposite surface opposite to the light entrance surface, and two side surfaces extending between the light entrance surface and the opposite surface. The support member has a mounting portion on which the lightguide plate is mounted. The support member further has hooks projecting upward from the mounting portion to engage with the side surfaces of the lightguide plate to secure the lightguide plate. The lightguide plate has projecting portions projecting from the side surfaces to extend directly above the hooks engaged with the side surfaces.

Conventionally, when a frame is used to secure a plurality of lightguide plates, the frame supports the lightguide plates in such a way as to surround the peripheries of the lightguide plates. Therefore, some frame portions form dark spots that do not transmit light. In the planar light-emitting device of the present invention, the lightguide plates are secured with hooks that engage with the two side surfaces thereof, and the side surfaces of each lightguide plate have projecting portions projecting directly above the hooks. Therefore, the hooks are hidden by the projecting portions when the lightguide plates are seen from the light-exiting surface side, thus making backlight illumination uniform free from dark spots as stated above.

The projecting portions may have on their upper surfaces microscopic optical configurations that make guided light emitted upward. That is, the upper surfaces of the projecting portions are provided with dot- or prism-shaped microscopic optical configurations that make light guided through the lightguide plate emitted upward, thereby compensating for the reduction of luminance due to the presence of the hooks underneath the projecting portions.

The upper surfaces of the projecting portions may be formed to extend contiguously from the light-exiting surface and inclined downward.

The support member may have an opposing portion opposing the light entrance surface. The light source may be held between the opposing portion and the light entrance surface.

The lightguide plate may have positioning pins projecting from the lower surface opposite to the light-exiting surface. That is, in the planar light-emitting device of the present invention, each lightguide plate has positioning pins projecting from the lower surface opposite to the light-exiting surface; therefore, the light-emitting units, including the lightguide plates, can be positioned and installed with high accuracy simply by inserting the positioning pins into mounting holes provided in a board or the like on which the light-emitting units are mounted side by side.

The arrangement may be as follows. At least either one of the light entrance surface and the opposite surface of the lightguide plate has a protruding portion protruding therefrom along the width direction thereof. Each pair of mutually adjacent light-emitting units are disposed such that the light entrance surface of one of the pair of mutually adjacent light-emitting units faces the opposite surface of the other light-emitting unit. The protruding portion extends between the light entrance surface and the opposite surface that face each other. The light source is disposed underneath the protruding portion. This is to prevent light from the light source from leaking out to the light-exiting surface side through the gap between a pair of mutually adjacent light-emitting units.

In addition, the present invention provides a liquid crystal display apparatus including a liquid crystal display panel and the above-described planar light-emitting device, which is disposed at the back of the liquid crystal display panel. The liquid crystal display apparatus can display a favorable image of high luminance uniformity and large area.

Embodiments of the present invention will be explained below with reference to the accompanying drawings. It should be noted that the scale of the figures used in the following explanation is properly changed to facilitate understanding of each constituent member.

BRIEF DESCRIPTION OF THE DRAWINGS

FIG. 1 is a sectional view showing two mutually adjacent light-emitting units in a first embodiment of the planar light-emitting device according to the present invention.

FIG. 2 is a plan view showing the planar light-emitting device including a plurality of adjacently disposed light-emitting units in the first embodiment.

FIG. 3 is a fragmentary perspective view of a lightguide plate used in each of the light-emitting units in the first embodiment as seen from the side of the light-entrance surface and the right side edge surface of the lightguide plate.

FIG. 4 is a diagram including fragmentary enlarged front view (a) as seen from the light-entrance surface side and fragmentary enlarged rear view (b) opposite to the light-entrance surface side of the lightguide plate in the first embodiment.

FIG. 5 is a diagram of the lightguide plate of the first embodiment including a top plan view (a), front view (b) and a side elevational view (c), the side elevational view showing a side edge surface provided with a projecting portion with an inclined upper surface extending from a light-exiting surface of the lightguide plate.

FIG. 6 is an exploded perspective view of a rigid board and a support member in the first embodiment.

FIG. 7 is a fragmentary enlarged vertical sectional view showing a liquid crystal display apparatus comprising the planar light-emitting device of the first embodiment of the present invention, with the support member and the rigid board removed therefrom.

FIG. 8 is an exploded perspective view of a planar light-emitting device according to a second embodiment of the present invention and a rigid board on which the planar light-emitting device is mounted.

DETAILED DESCRIPTION OF THE INVENTION

FIGS. 1 to 7 show a planar light-emitting device 1 according to a first embodiment of the present invention. The planar light-emitting device 1 is a backlight unit of a liquid crystal display apparatus. As shown in FIGS. 1 and 2, the planar light-emitting device 1 comprises a plurality of light-emitting units 7 arranged adjacent to each other in a matrix. Each light-emitting unit 7 has an LED light source (light source) 2, a lightguide plate 3, and a support member 4 securely supporting the LED light source 2 and the lightguide plate 3 on an upper surface of the support member 4, a reflecting sheet 5 installed between the upper surface of the support member 4 and the lower surface of the lightguide plate 3, and a flexible printed circuit board (FPC) 6 connected to the LED light source 2 at the distal end portion of the FPC 6. In this embodiment, the light-emitting units 7 are arranged in a matrix of 6 rows and 6 columns as shown in FIG. 2, for example.

The lightguide plate 3 is rectangular in plan view having an upper surface as a light-exiting surface 3f, a lower surface opposite to the upper surface, and a peripheral side surface between the upper surface and the lower surface, the peripheral side surface including a light entrance surface 3a that receives light from the LED light source 2, an opposite surface 3b opposite to the light entrance surface 3a, right and left side edge surfaces extending between the light entrance surface 3a and the opposite surface 3b. The lightguide plate 3 is formed of a resin; a transparent polycarbonate or acrylic resin, for example.

The light-entrance surface 3a and the opposite surface 3b have respective protruding portions; a first protruding portion 3d at the light-entrance surface 3a and a second protruding portion 3c at the opposite surface, each having a surface flush with the light-exiting surface 3f. The second protruding portion 3c at the opposite surface protrudes more than the first protruding portion 3d at the light-entrance surface. In each adjacently disposed pair of light-emitting units 7 facing each other at the light-entrance surface of a first lightguide plate 3 in a first light-emitting unit 7 and the opposite surface of a second lightguide plate 3 in a second light-emitting unit 7, a first protruding portion 3d of the first lightguide plate 3 are disposed to substantially abut against the second protruding portion 3d of the second lightguide plate 3 adjacently disposed to face the light-entrance surface of the first lightguide plate.

The light entrance surface 3a has, as shown in FIGS. 3 and 4 (a), a plurality of light entrance prisms 3e of V-shaped sectional configuration that extend on the light-entrance surface 3a between both edges of the upper surface and the lower surface of the lightguide plate; in the thickness direction, of the lightguide plate 3 to cause incident light to diverge in the width direction of the light-entrance surface 3a. The light-exiting surface 3f has, for example, a white dot pattern (not shown) formed on the light-exiting surface 3f. The lower surface may be provided with prism- or lenticular lens-shaped microscopic optical configurations, for example, to direct light toward the upper surface as the light-exiting surface 3f. For example, the lower surface may be provided with prism-shaped microscopic optical configurations having a sectional shape of an isosceles triangle. In this case, the apex angle of the prisms may be set to gradually increase with the prism-shaped microscopic optical configurations being situated farther away from the LED light source 2. Alternatively, the lower surface may be provided with prism-shaped microscopic optical configurations having a sectional shape of a scalene triangle. In this case, the depth of the prism configuration may be set to gradually increase or the prism pitch may be set to gradually decrease as the prism apex angle increases.

The right and left side edge surfaces of the lightguide plate 3 each have, as shown in FIGS. 3 to 5, a projecting portion 3g having an inclined surface at the top of the projecting portion 3g that is downwardly and outwardly inclined from the upper surface of the lightguide plate. The inclined surface of the projecting portion 3g is inclined at 45°, for example, with respect to the upper surface as the light-exiting surface 3f. The inclined surface at the top of the projecting portion 3g refracts upward light exiting from the inclined surface to compensate for the lack of luminance at the area between the mutually adjacent lightguide plates 3; the area around the right and left side edge surfaces of the lightguide plates 3. The lightguide plates of the light-emitting units disposed in a matrix as shown in FIG. 2, face each other at at least one of the respective right and left side edge surfaces.

The projecting portion 3g has at the distal end of the inclined surface a pin abutting portion 31 against which an ejector pin can abut. The projecting portion 3g has a hook retaining portion 3h in the shape of a groove having a V-shaped sectional configuration; the groove is engraved laterally in the lightguide plate at the bottom of the projecting portion 3g. The hook retaining portion 3h is fitted with the distal ends of a plurality of hook-shaped lightguide plate hooks 4a extending upward from the right and left side edges of the support member 4 to retain the lightguide plate hooks 4a. The projecting portion 3g is designed to hide the lightguide plate hooks 4a under the projecting portion 3g as the lightguide plate 3 is seen from the light-exiting surface side.

As shown in FIG. 6, the lightguide plate hooks 4a are provided at the right and left side end edges of the support member 4 in asymmetric relation to each other. A part of the upper surface of the projecting portion 3g that includes the upper surface of the pin abutting portion 31 and the neighborhood of the pin abutting portion 31 is provided with microscopic optical configurations (not shown), e.g. prism-, embossed- or dot-shaped microscopic optical configurations. The microscopic optical configurations compensate for the reduction of luminance due to the presence of the hook retaining portion 3h and the lightguide plate hooks 4a dispose underneath the projecting portion 3g.

The LED light source 2 comprises white LEDs. The white LED is, for example, a semiconductor light-emitting element mounted on a substrate and sealed with a resin material. The semiconductor light-emitting element is, for example, a blue (wavelength λ: 470 to 490 nm) LED element or an ultraviolet (wavelength λ: less than 470 nm) LED element, which is formed by stacking a plurality of semiconductor layers of a gallium nitride compound semiconductor (e.g. InGaN compound semiconductor) on an insulating substrate, e.g. a sapphire substrate.

The resin material used to seal the semiconductor light-emitting element is formed, for example, by adding a YAG fluorescent substance into a silicone resin as a main component. The YAG fluorescent substance converts blue or ultraviolet light from the semiconductor light-emitting element into yellow light, and white light is produced by color mixing effect. The LED light source 2 is disposed with its front end surface (light-exiting surface) opposed close to the light entrance surface 3a of the lightguide plate 3. The LED light source 2 has a reflecting frame formed on the resin material side surfaces of the sealing resin except the front end surface (light-exiting surface) opposed close to the light-entrance surface 3a of the lightguide plate 3 so as to emit light only from the front end surface. Accordingly, light-exiting from the front end surface of the LED light source 2 cannot leak out through the gap between the first and the second protruding portions 3d and 3c of the adjacently disposed pairs of lightguide plates 3 that faces and abut against each other at the first protruding portion 3d of the entrance surface of the first lightguide plate 3 and the second protruding portion 3c of the opposite surface of the second lightguide plate 3 as described before. It should be noted that white LEDs are not limited to those described above, but various white LEDs are usable.

A reflecting sheet 5 disposed underneath the lower surface of the lightguide plate 3 is a metal plate, film, foil or the like having a light-reflecting function. In this embodiment, the reflecting sheet 5 is a film provided with an evaporated silver layer. It should be noted, however, that an evaporated aluminum layer or the like may be used in place of the evaporated silver layer. The reflecting sheet 5 is bonded onto the support member 4 by using double-coated adhesive tape 8.

The support member 4 is, as shown in FIG. 6, installed on a rigid board (board) 9 of an apparatus in which the planar light-emitting device is incorporated. That is, the support member 4 has a plurality of downwardly projecting board hooks 4i, which are fitted into corresponding hook holes 9a formed in the rigid board 9 to secure the support member 4 to the rigid board 9.

The support member 4 is provided with an upwardly bent LED support portion 4j at one side edge of the support member 4. As shown in FIG. 1, the LED support portion 4j supports the LED light source 2, together with the FPC board 6, through a heat-dissipating sheet 10, for example. Examples of materials usable as the heat-dissipating sheet 10 are copper or other metal sheets, thermally conductive film such as Kapton (available from DuPont), and phase change sheet such as PCS-TC-20 (available from Shin-Etsu Silicones).

The LED light source 2, the FPC board 6, the heat-dissipating sheet 10 and the LED support portion 4j are disposed in the gap between the mutually adjacent lightguide plates 3. That is, in the adjacent pairs of lightguide plates 3; in each pair of which the lightguide plates are disposed such that the first protruding portion 3d of the first lightguide plate 3 and the second protruding portion 3c of the second lightguide plate 3 abut against each other as described before, the LED light source 2 associated with or included in the first light-emitting unit 7 are disposed in a space formed underneath the abutting first protruding portions 3d and the second protruding portion 3c.

The FPC board 6 is connected to the LED light source 2 at the distal end of the FPC board 6, and the proximal end of the FPC board 6 extends to the lower side of the support member 4 through an hole 4k formed in the support member 4 and is connected to another FPC board 11 that is installed on the rigid board 9.

FIG. 7 is a fragmentary sectional view of a liquid crystal display apparatus 15 according to the present invention. The liquid crystal display apparatus 15 is a display apparatus applicable to a liquid crystal display of a large-sized liquid crystal television, for example, and has a liquid crystal display panel 13 and a planar light-emitting device 1 disposed at the lower surface side of the liquid crystal display panel 13.

Specifically, the liquid crystal display apparatus 15 includes a planar light-emitting device 1 having a plurality of light-emitting units 7 arrayed on a rigid board 9, a diffusing plate 12A that diffuses light from the planar light-emitting device 1 to obtain a uniform light intensity distribution, a diffusing sheet 12B disposed over the diffusing plate 12A, a prism sheet 14 disposed over the diffusing sheet 12B to direct light as upward illuminating light from the diffusing sheet 12B toward a liquid crystal display panel 13, disposed over the prism sheet 14, and a reflecting sheet 5 disposed underneath the lightguide plate 3.

The diffusing plate 12A and the diffusing sheet 12B are a plate and a sheet, respectively, made of a transparent resin, e.g. an acrylic or polycarbonate resin, having silica particles or the like dispersed therein.

The prism sheet 14 is a transparent sheet-shaped member for collecting light from the diffusing sheet 12B toward upward and the prism sheet 14 has a plurality of prisms having mutually parallel ridges on the upper surface of the prism sheet 14. The prisms of the prism sheet 14 extend to intersect, in plan view, the optical axis of light from the LED light source 2 that is guided through the lightguide plate 3. To obtain high directivity in the upward direction, in particular, the prisms of the prism sheet 14 are set to extend parallel to a direction perpendicularly intersecting the optical axis of light from the LED light source 2 in plan view.

The liquid crystal display panel 13 is a transmissive or semitransmissive liquid crystal display panel. In the case of a transmissive liquid crystal display panel 13, for example, it has a panel body having a liquid crystal material, e.g. TN liquid crystal or STN liquid crystal, sealed with a sealant in a gap between an upper substrate and a lower substrate, each having a transparent electrode layer, an alignment film and a polarizer.

Thus, the planar light-emitting device 1 of the first embodiment comprises a plurality of light-emitting units 7 arrayed on a rigid board 9. Each light-emitting unit 7 has a support member 4 that secures a lightguide plate 3 mounted on the support member 4 together with an LED light source 2. Therefore, the optical axis of the LED light source 2 and the light entrance surface 3a of the lightguide plate 3 can be positioned with respect to each other on the support member 4 of each light-emitting unit 7 in advance to arraying a plurality of such light-emitting units 7 on the rigid board 9. Accordingly, a higher positional accuracy can be obtained than in the case of mounting LED light sources 2 and lightguide plates 3 separately and directly on a large-sized rigid board 9. In addition, any light-emitting unit 7 having luminance non-uniformity or other problem can be replaced individually. Thus, the replacing operation can be performed easily. In addition, because the support member 4 and the rigid board 9 function as heat-dissipating members, high heat-dissipating characteristics can be obtained. Particularly, because the support member 4 is metallic, an even more enhanced heat-dissipating effect can be obtained.

Further, because both right and left side edge surfaces of the lightguide plate 3 have respective projecting portions 3g projecting directly above the lightguide plate hooks 4a extending from the support member 4, the lightguide plate hooks 4a are hidden by the projecting portions 3g as the lightguide plate 3 when seen from the light-exiting surface side. Thus, the lightguide plate hooks 4a do not appear as dark spots of light, and uniform backlight illumination can be obtained. This advantageous effect can be further enhanced by providing the top surface of each projecting portion 3g with microscopic optical configurations that direct the guided light to be emitted upward.

Further, the lightguide plates 3 are each in the shape of a rectangle in which the ratio of the short side to the long side is set to from 0.5 to 0.6, and arranged in a matrix in which the numbers of rows and columns are equal to each other. This arrangement enables an increase in size of the backlight unit while keeping the aspect ratio of 16:9, which is the mainstream aspect ratio for large-sized backlight units. Accordingly, the liquid crystal display apparatus 15 employing the planar light-emitting device 1 as a backlight unit can display a favorable image of high luminance uniformity and large area by a plurality of LED light sources and lightguide plates that are readily replaceable and mounted with high accuracy.

FIG. 8 shows a planar light-emitting device according to a second embodiment of the present invention. The second embodiment differs from the first embodiment as follows. In the first embodiment, each lightguide plate 3 is mounted on the support member 4, and the support member 4 is installed on the rigid board 9. In the second embodiment, each lightguide plate 23 has a plurality of positioning pins 23a projecting from the lower surface opposite to the light-exiting surface 3f. The positioning pins 23a are inserted into respective mounting holes 9b formed in the rigid board 9 to install the lightguide plate 23 directly on the rigid board 9 without interposing any part of the support member 24 between the lightguide plate and the rigid board.

More specifically, the support member 24 of the planar light-emitting device 20 in the second embodiment is a metallic frame disposed at a side of the lightguide plate 23 closer to the light entrance surface 3a and has no part to be disposed underneath the lightguide plate 23.

The lightguide plate 23 has a pair of mounting pins 23b formed on the opposite ends on the light entrance surface 3a. The flexible printed circuit board 26 and the support member 24 have respective pairs of through-holes 26a and 24a formed on their opposite ends whose positions are disposed in correspondence to the mounting pins 23b. The flexible printed circuit board 26 and the support member 24, together with the LED light source 2, are positioned and secured to the lightguide plate 23 by inserting the mounting pins 23b through the through-holes 26a and 24a. The positioning pins 23a and the mounting pins 23b are integrally molded with the lightguide plate 23 by injection molding.

Thus, in the planar light-emitting device 20 of the second embodiment, each light-emitting unit including the lightguide plate 23 can be positioned with high accuracy simply by inserting the positioning pins 23a of the lightguide plate 23 into the mounting holes 9b of the rigid board 9.

The positioning pins 23a are preferably provided on the bottom of each projecting portion 3g to prevent, as much as possible, luminance unevenness from occurring on the light-exiting surface 3f of the lightguide plate 23. The positioning pins 23a may, however, be provided anywhere on the lower surface of the lightguide plate 23 (i.e. the surface opposite to the light-exiting surface 3f).

It should be noted that the present invention is not necessarily limited to the foregoing embodiments but can be modified in a variety of ways without departing from the scope of the present invention.

For example, RGB-LEDs may be used as the LED light source to emit light of all colors. An RGB-LED may comprise, for example, a combination of a red LED element (R), a green LED element (G) and a blue LED element (B) mounted in one package. Alternatively, LEDs emitting mutually different colors of light may be provided for each lightguide plate. In these cases, it is possible to illuminate a liquid crystal display panel or the like with various colors of light over the whole planar light-emitting device or for each light-emitting unit by controlling the applied electric current in each LED.

Although one diffusing plate and one diffusing sheet are used in the liquid crystal display apparatus in the foregoing embodiments of the present invention, either of the diffusing plate and the diffusing sheet may be omitted, or at least either of them may comprise a plurality of them. The liquid crystal display apparatus may have a diffusing plate or sheet between the prism sheet and the liquid crystal display panel. In other words, the installation position and the number of diffusing plates or sheets used are properly set with haze taken into account to correct luminance non-uniformity.

Although one prism sheet is used in the foregoing embodiments, the crystal display apparatus may have two prism sheets. The diffusing plate, the diffusing sheet and the prism sheet may each comprise a plurality of split segments that are arrayed in the same way as the lightguide plates.

The light sources used in the present invention are not limited to LED light sources but may be fluorescent lamps or other types of light sources. The light-emitting units do not necessarily need to be installed on the rigid board. That is, if the support member of each light-emitting unit is provided with connecting parts that can be connected and secured to the support members of other light-emitting units adjacent thereto, for example, the light-emitting units can be arrayed to constitute a planar light-emitting device without using the rigid board.

In the second embodiment, the lightguide plate is positioned and secured by inserting the positioning pins into the rigid board. This positioning and securing structure may be adopted in the first embodiment. That is, in the first embodiment, the lightguide plate is provided with positioning pins, and the support member and the rigid board are each provided with mounting holes. Thus, the lightguide plate can be positioned and secured to both the support member and the rigid board with high accuracy by inserting the positioning pins into the mounting holes.

The invention claimed is:

1. A planar light-emitting device comprising a plurality of light-emitting units, each light-emitting unit comprising:
   a lightguide plate having
   (i) an upper surface as a light-exiting surface,
   (ii) a lower surface opposite to the light-exiting surface, and
   (iii) a peripheral side surface extending between respective peripheral edges of the light-exiting surface and the lower surface, wherein the peripheral side surface includes a light entrance surface, an opposite surface opposite to the light entrance surface, and two side surfaces extending between the light entrance surface and the opposite surface;
   a light source positioned adjacent to the light entrance surface to emit light into the lightguide plate through the light entrance surface; and
   a support member that fixedly supports the light source and the lightguide plate,
   wherein the support member has a mounting portion on which the lightguide plate is mounted, and the support member further has hooks projecting upward from the mounting portion to engage with the side surfaces of the lightguide plate to secure the lightguide plate,
   wherein the lightguide plate has projecting portions projecting from the side surfaces to extend directly above the hooks engaged with the side surfaces, the projecting portions having respective upper surfaces that extend contiguously and incline downward from the light-exiting surface, and
   wherein the light-emitting units are arranged side by side with the upper surfaces of their respective lightguide plates being substantially flush with each other.

2. A planar light-emitting device comprising a plurality of light-emitting units, each light-emitting unit comprising:
   a lightguide plate having
   (i) an upper surface as a light-exiting surface,
   (ii) a lower surface opposite to the light-exiting surface, and
   (iii) a peripheral side surface extending between respective peripheral edges of the light-exiting surface and the lower surface, wherein the peripheral side surface includes a light entrance surface, an opposite surface opposite to the light entrance surface, and two side surfaces extending between the light entrance surface and the opposite surface;
   a light source positioned adjacent to the light entrance surface to emit light into the lightguide plate through the light entrance surface; and
   a support member that fixedly supports the light source and the lightguide plate;
   wherein the support member has a mounting portion on which the lightguide plate is mounted, and the support member further has hooks projecting upward from the mounting portion to engage with the side surfaces of the lightguide plate to secure the lightguide plate,
   wherein the lightguide plate has projecting portions projecting from the side surfaces to extend directly above the hooks engaged with the side surfaces, the projecting portions having respective upper surfaces that extend continuously and incline downward from the light-exiting surface,
   wherein the projecting portions have microscopic optical configurations that direct light toward the light-exiting surface, and
   wherein the light-emitting units are arranged side by side with the upper surfaces of their respective lightguide plates being substantially flush with each other.

3. The planar light-emitting device of claim 1, wherein the support member of each light-emitting unit has an opposing portion opposing the light entrance surface, the light source being held between the opposing portion of the support member and the light entrance surface of the lightguide plate.

4. The planar light-emitting device of claim 1, wherein the lightguide plate of each light-emitting unit has positioning pins projecting from the lower surface opposite to the light-exiting surface.

5. The planar light-emitting device of claim 1, wherein at least one of the light entrance surface and the opposite surface of the lightguide plate of each light-emitting unit has a protruding portion protruding therefrom along a width direction of the lightguide plate; and
   wherein each pair of mutually adjacent ones of the light-emitting units are disposed such that the light entrance surface of one of the mutually adjacent light-emitting units faces the opposite surface of the other of the mutually adjacent light-emitting units, with the protruding portion extending between the light entrance surface and the opposite surface that face each other, and the light source being disposed underneath the protruding portion.

6. The planar light-emitting device of claim 1, wherein the light entrance surface and the opposite surface of the lightguide plate of each light-emitting unit have a protruding portion protruding therefrom along width direction of the lightguide plate; and
    wherein each pair of mutually adjacent ones of the light-emitting units are disposed such that the light entrance surface of one of the mutually adjacent light-emitting units faces the opposite surface of the other of the mutually adjacent light-emitting units, with the protruding portions of the pair of mutually adjacent light-emitting units abutting against each other, and the light source being disposed underneath the abutting protruding portions.

7. The planar light-emitting device of claim 1, further comprising a board on which the light-emitting units are mounted and secured.

8. A liquid crystal display apparatus comprising:
    a liquid crystal display panel; and
    the planar light-emitting device of claim 1, which is disposed at a back of the liquid crystal display panel.

9. The planar light-emitting device of claim 2, wherein the support member of each light-emitting unit has an opposing portion opposing the light entrance surface, the light source being held between the opposing portion of the support member and the light entrance surface of the lightguide plate.

10. The planar light-emitting device of claim 2, wherein the lightguide plate of each light-emitting unit has positioning pins projecting from the lower surface opposite to the light-exiting surface.

11. The planar light-emitting device of claim 2, wherein at least one of the light entrance surface and the opposite surface of the lightguide plate of each light-emitting unit has a protruding portion protruding therefrom along a width direction of the lightguide plate; and
    wherein each pair of mutually adjacent light-emitting units are disposed such that the light entrance surface of one of the mutually adjacent light-emitting unit faces the opposite surface of the other of the mutually adjacent light-emitting units, with the protruding portion extending between the light entrance surface and the opposite surface that face each other, and the light source being disposed underneath the protruding portion.

12. The planar light-emitting device of claim 2, wherein the light entrance surface and the opposite surface of the lightguide plate of each light-emitting unit have a protruding portion protruding therefrom along width direction of the lightguide plate; and
    wherein each pair of mutually adjacent ones of the light-emitting units are disposed such that the light entrance surface of one of the mutually adjacent light-emitting units faces the opposite surface of the other of the mutually adjacent light-emitting units, with the protruding portions of the pair of mutually adjacent light-emitting units abutting against each other, and the light source being disposed underneath the abutting protruding portions.

13. The planar light-emitting device of claim 2, further comprising a board on which the light-emitting units are mounted and secured.

14. A liquid crystal display apparatus comprising:
    a liquid crystal display panel; and
    the planar light-emitting device of claim 2, which is disposed at a back of the liquid crystal display panel.

\* \* \* \* \*

UNITED STATES PATENT AND TRADEMARK OFFICE
CERTIFICATE OF CORRECTION

| | |
|---|---|
| PATENT NO. | : 8,077,272 B2 |
| APPLICATION NO. | : 12/434435 |
| DATED | : December 13, 2011 |
| INVENTOR(S) | : Takashi Shimura et al. |

It is certified that error appears in the above-identified patent and that said Letters Patent is hereby corrected as shown below:

IN THE CLAIMS

In claim 11, column 12, line 6, please replace "adjacent light-emitting" with --adjacent ones of the light-emitting--

In claim 11, column 12, line 8, please replace "light-emitting unit faces" with --light-emitting units faces--

Signed and Sealed this
Sixth Day of March, 2012

David J. Kappos
*Director of the United States Patent and Trademark Office*